(12) United States Patent
Arbjerg et al.

(10) Patent No.: US 10,717,464 B2
(45) Date of Patent: Jul. 21, 2020

(54) HYDRAULIC STEERING UNIT

(71) Applicant: Danfoss Power Solutions ApS, Nordborg (DK)

(72) Inventors: Niels Arbjerg, Sydals (DK); Charles Anthony Bates, Soenderborg (DK); Poul Ennemark, Soenderborg (DK); Mogens Frederiksen, Sydals (DK); Casper Mikael Olesen, Soenderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 189 days.

(21) Appl. No.: 15/970,344

(22) Filed: May 3, 2018

(65) Prior Publication Data
US 2018/0319432 A1  Nov. 8, 2018

(30) Foreign Application Priority Data

May 8, 2017 (DE) .................. 10 2017 109 803

(51) Int. Cl.
*B62D 5/065* (2006.01)
*B62D 5/093* (2006.01)
(Continued)

(52) U.S. Cl.
CPC .............. *B62D 5/065* (2013.01); *B62D 5/08* (2013.01); *B62D 5/093* (2013.01); *B62D 5/14* (2013.01)

(58) Field of Classification Search
CPC .......... B62D 5/065; B62D 5/08; B62D 5/093; B62D 5/14
See application file for complete search history.

(56) References Cited

U.S. PATENT DOCUMENTS 4,372,413 A    2/1983  Petersen et al.
4,412,415 A *  11/1983  Thomsen ............... B62D 5/093
                                                                 60/384
(Continued)

FOREIGN PATENT DOCUMENTS

CN    103707923 B    5/2016
DE    10216959 B3    1/2004
(Continued)

OTHER PUBLICATIONS

First Examination Report for Indian Serial No. 201814007450 dated Sep. 11, 2019.
(Continued)

*Primary Examiner* — Tony H Winner
*Assistant Examiner* — Michael R Stabley
(74) *Attorney, Agent, or Firm* — McCormick, Paulding & Huber PLLC

(57) ABSTRACT

A hydraulic steering unit (1) is described comprising a supply port arrangement having a pressure port (8) connected to a main flow path (6) and a tank port (T) connected to a tank flow path (7), a working port arrangement having a left working port (L) connected to a left working flow path (9) and a right working port (R) connected to a right working flow path (10), a bridge arrangement (14) of variable orifices having a first left orifice (A2L) connected to the main flow path (6) and to the left working flow path (9), a first right orifice (A2R) connected to the main flow path (6) and to the right working flow path (10), a second left orifice (A3L) connected to the left working flow path (9) and to the tank flow path (7), and a second right orifice (A3R) connected to the right working flow path (10) and to the tank flow path (7). Such a hydraulic steering unit should allow comfortable steering. To this end a measuring motor arrangement is arranged in one of the left working flow path (9) and the
(Continued)

right working flow path (10), the measuring motor arrangement (15) having a first measuring motor (16) and a second measuring motor (17).

20 Claims, 1 Drawing Sheet

(51) Int. Cl.
  *B62D 5/08* (2006.01)
  *B62D 5/14* (2006.01)

(56) References Cited

U.S. PATENT DOCUMENTS

| | | | |
|---|---|---|---|
| 4,676,334 A | 6/1987 | Nakamura et al. | |
| 4,860,846 A * | 8/1989 | Uchida | B62D 5/083 180/423 |
| 4,958,493 A | 9/1990 | Schutten et al. | |
| 5,819,532 A | 10/1998 | Wang et al. | |
| 7,631,590 B2 * | 12/2009 | Thomsen | B62D 5/065 60/384 |
| 9,242,668 B2 * | 1/2016 | Ennemark | B62D 5/093 |
| 9,550,521 B2 * | 1/2017 | Andersen | B62D 5/093 |
| 2002/0092698 A1 | 7/2002 | Juul et al. | |
| 2014/0298792 A1 * | 10/2014 | Andersen | B62D 5/093 60/433 |
| 2016/0298658 A1 * | 10/2016 | Liljenberg | F15B 11/08 |

FOREIGN PATENT DOCUMENTS

| | | |
|---|---|---|
| EP | 2610136 A1 | 7/2013 |
| EP | 3093212 A1 | 11/2016 |

OTHER PUBLICATIONS

International Search Report for Serial No. PCT/EP2018/060042 dated Aug. 3, 2018.

* cited by examiner

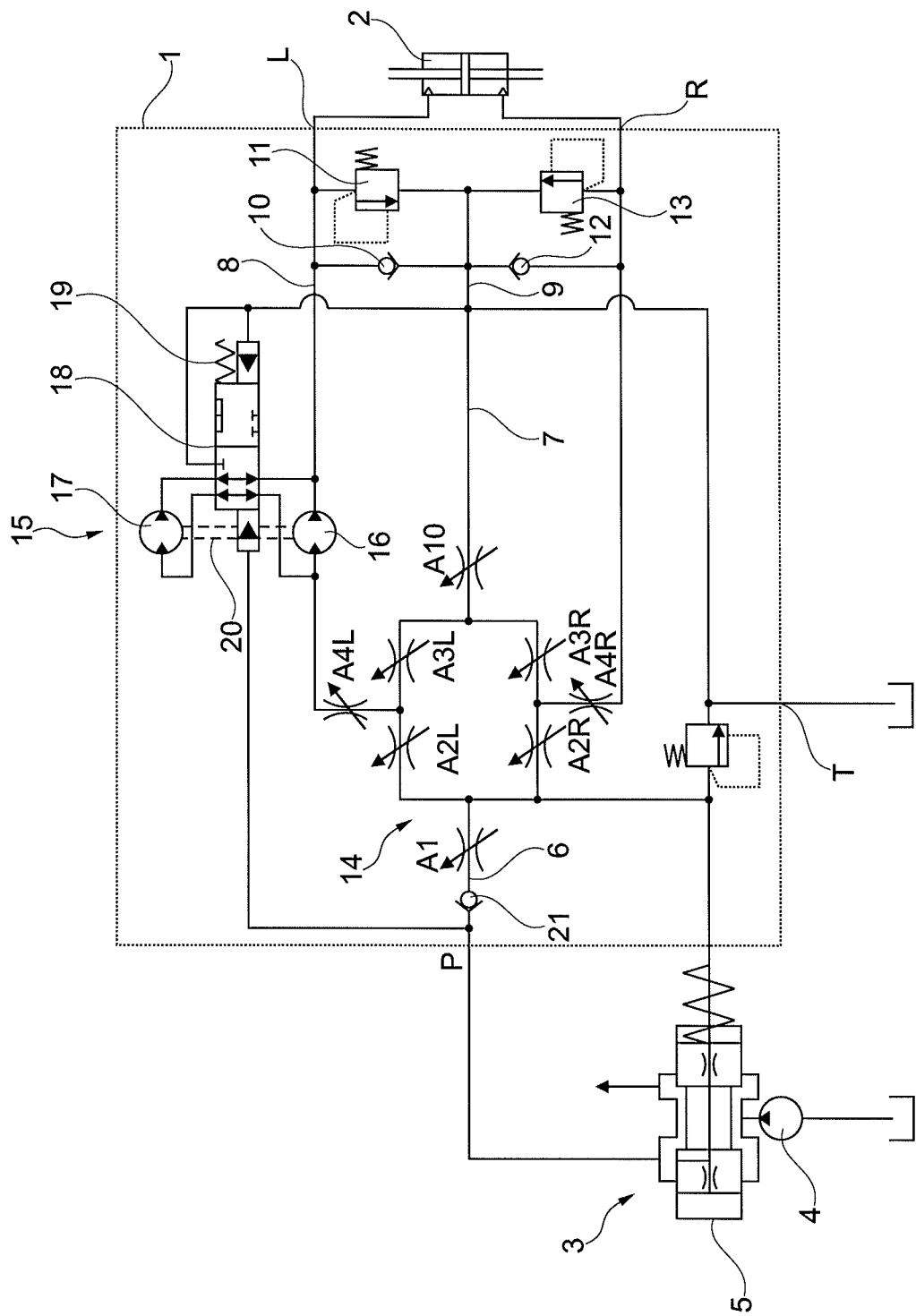

HYDRAULIC STEERING UNIT

CROSS-REFERENCE TO RELATED APPLICATION

This application claims foreign priority benefits under U.S.C. § 119 to German Patent Application No. 10 2017 109 803.8 filed on May 8, 2017, the content of which is hereby incorporated by reference in its entirety.

TECHNICAL FIELD

The present invention relates to a hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path.

BACKGROUND

Such a steering unit is known, for example, from U.S. Pat. No. 4,676,334. In such a kind of hydraulic steering unit the variable orifices are arranged in a kind of Wheatstone bridge. One diagonal of the bridge is arranged between the pressure port and the tank port and the other diagonal is arranged between the two working ports.

When, for example, it is intended to steer a vehicle equipped with such a steering unit to the left, the first left orifice and the second right orifice are opened, wherein the second left orifice and the first right orifice are closed. Hydraulic fluid from the pressure port then flows through the first left orifice to the left working port and from there to a steering motor connected to the working port arrangement. Hydraulic fluid displaced from the steering motor flows back through the right working port and the right working flow path to the second right orifice. When passing the second right orifice the fluid is returned to the tank flow path and from there to the tank port.

SUMMARY

The object underlying the invention is to enable a comfortable steering.

This object is solved with a hydraulic steering unit as described at the outset in that a measuring motor arrangement is arranged in one of the left working flow path and the right working flow path, the measuring motor arrangement having a first measuring motor and a second measuring motor.

Such an arrangement has a couple of advantages. Arranging measuring motors in one of the working flow paths minimizes the dead band of the steering unit. The orifices are formed by a spool-sleeve-set. When a steering wheel is actuated, the spool and the sleeve are rotated relatively to each other to open some of the orifices and to close other ones of the orifices. The steering wheel is connected to one of spool and sleeve. Hydraulic fluid from the pressure port to the working port arrangement or from the working port arrangement to the tank port flows through the measuring motor arrangement and drives the measuring motor arrangement. The measuring motor arrangement is connected to the other one of spool and sleeve which is not connected to the steering wheel and restores the spool and the sleeves relatively to each other to their original or neutral position. When the pressure at the pressure port decreases and is not sufficient to actuate a steering motor connected to the working port arrangement, the measuring motor arrangement can be used as auxiliary pump so that a vehicle equipped with such a steering unit is still able to be steered. When the measuring motor arrangement has more than one measuring motor it is possible to adjust the force in emergency situations and to adjust the displacement during normal operation.

In an embodiment of the invention a valve is arranged between the measuring motors establishing a parallel connection between the measuring motors or interrupting the parallel connection. In normal or undisturbed conditions the two measuring motors are operated parallel to each other. Therefore, the measuring motors together have a rather large displacement. This means that steering can be made very comfortable, i. e. a driver does not need much rotation of the steering wheel to change the direction of the vehicle. When, however, in an emergency case the measuring motor arrangement has to be operated as auxiliary pump, only one measuring motor, for example, is used so that the pumping of hydraulic fluid by means of the measuring motor does not require much force as well.

In an embodiment of the invention the valve short-circuits one of the measuring motors when the parallel connection is interrupted. The short-circuited measuring motor can then be rotated with low forces.

In an embodiment of the invention the valve is actuated by a pressure difference between the pressure port and the tank port and the force of a spring. In an undisturbed condition there is enough pressure at the pressure port, so that the pressure difference between the pressure port and the tank port is positive and the valve is actuated to establish the parallel connection between the measuring motors. When, however, the pressure at the pressure port decreases and becomes finally equal to the pressure at the tank port, the force of the spring shifts the valve in another position in which the parallel connection is interrupted and, for example, the non-connected measuring motor is short-circuited.

In an embodiment of the invention a check valve is arranged between the pressure port and the bridge, the check valve opening in a direction towards the bridge. As long as the pressure at the pressure port is the highest pressure in the system, hydraulic fluid can pass the check valve because the pressure of the pressure port opens the check valve. If, however, the pressure at the pressure port decreases and the measuring motor has to be operated to produce the necessary pressure, the check valve is used to prevent a back flow of hydraulic fluid out of the pressure port of the steering unit. The flow generated by the measuring motor can completely be used to actuate the steering motor connected to the working port arrangement.

In an embodiment of the invention a variable main orifice is arranged in the main flow path upstream the variable first left orifice and the variable first right orifice. By adding the main orifice, it is possible to lower the flow around the neutral position of the variable orifices in the bridge arrangement. An outcome of having a lower supply flow entering the bridge arrangement is that the general pressure level inside the bridge arrangement will be lowered and therefore the outer forces acting on the steering unit will have a greater impact on the other parts of the steering unit. Thereby the self-realignment capabilities are improved.

The main orifice can be closed in a neutral position of the steering unit. In this way the main orifice can be used to realize a closed neutral steering unit. Alternatively the main orifice can have a minimum opening in the neutral position of the steering unit. In this case the main orifice just lowers the flow of hydraulic fluid around the neutral position of the variable orifices in the bridge arrangement.

In an embodiment of the invention a tank orifice is arranged in the tank flow path. The tank orifice can be used for creating a back pressure to improve stability. In other words, the pressure in working chambers of a steering motor connected to the working port arrangement can be kept on a rather high level. When the tank orifice is variable, it is also possible to decrease the resistance across the second variable orifice, wherein the right or left second orifice depends on the direction of steering.

In an embodiment of the invention a variable third left orifice is arranged in the left working flow path and a variable third right orifice is arranged in the right working flow path. This makes it possible to realize a closed neutral steering unit in an open-center system. In a neutral position the working flow paths are interrupted so that the hydraulic fluid is trapped in the working flow paths and in the respective pressure chambers of the steering motor. The variable third left orifice and the variable third right orifice open preferable faster than the other orifices in the bridge. The third orifices open preferably as fast as possible. They are used only to trap hydraulic fluid in the working flow path.

BRIEF DESCRIPTION OF THE DRAWINGS

An embodiment of the invention will now be described in more detail with reference to the drawing, in which:

The only FIGURE shows a schematic illustration of a steering unit.

DETAILED DESCRIPTION

A hydraulic steering unit 1 comprises a supply port arrangement having a pressure port P and a tank port T. Furthermore, the hydraulic steering unit 1 comprises a working port arrangement having a left working port L and a right working port R. A steering motor 2 is connected to the working port arrangement L, R.

The pressure port is connected to a pressure source 3 which can basically be of any form. In the present case the pressure source 3 comprises a pump 4 and a priority valve 5.

The pressure port P is connected to a main flow path 6. The tank port T is connected to a tank flow path 7. The left working port L is connected to a left working flow path 8 and the right working port is connected to a right working flow path 9.

The left working flow path 8 is connected to the tank flow path 7 by means of a check valve 10. The left working flow path 8 is furthermore connected to the tank flow path 7 by means of a pressure relief valve 11. In similar way the right working flow path 9 is connected to the tank flow path 7 via a check valve 12. Furthermore the right working flow path 9 is connected to the tank flow path 7 via a pressure relief valve 13.

The hydraulic steering unit 1 comprises a bridge arrangement 14 of variable orifices, which are a first left orifice A2L, a second left orifice A3L, a first right orifice A2R and a second right orifice A3R. The first left orifice A2L is connected to the main flow path 6 and to the left working flow path 8. The second left orifice A3L is connected to the left working flow path 8 and to the tank flow path 7. The first right orifice is connected to the main flow path 6 and to the right working flow path 9. The second right orifice A3R is connected to the right working flow path 9 and to the tank flow path 7.

In other words: one diagonal of the bridge arrangement 14 is arranged between the pressure port P and the tank port T and the other diagonal of the bridge arrangement 14 is arranged between the two working ports L, R.

A measuring motor arrangement 15 is arranged in the left working flow path 8. Alternatively it could also be arranged in the right working flow path 9.

The measuring motor arrangement 15 comprises a first measuring motor 16 and a second measuring motor 17. A valve 18 is provided to establish a parallel connection between the measuring motors 16, 17 as shown in the FIGURE or to interrupt the parallel connection between the two motors 16, 17. In the last case the valve 18 short-circuits the measuring motor 17 which is no longer connected parallel to the first measuring motor 16.

The valve 18 is actuated by a pressure difference between the pressure port P and the tank port T. Furthermore, the force of a spring 19 acts on the valve 18 to actuate it.

If there is enough pressure at the pressure port P, the pressure difference between the pressure port P and the tank port T shifts the valve against the force of spring 19 in the position shown in which the measuring motors 16, 17 are connected in parallel.

However, when the pressure at the pressure port P decreases, for example, when a hydraulic pump driven by a motor of a vehicle is defect, a pressure difference between the pressure port P and the tank port T decreases as well. When this pressure difference decreases below a predetermined value, the force of the spring 19 shifts the valve 18 in the position in which the parallel connection of the measuring motors 16, 17 is interrupted and the measuring motor 17 is short-circuited.

The measuring motors, 16, 17 have a common shaft 20. The orifices of the bridge arrangement 14 are formed by a spool-sleeve-set. When a steering wheel or another steering command means is actuated, spool and sleeve are rotated relatively to each other to open two orifices and to close two other orifices. When, for example, it is intended to steer the vehicle equipped with the steering unit 1 to the left, the first left orifice A2L and the second right orifice A3R are opened and the second left orifice A3L and the first right orifice A2R are closed. Hydraulic fluid passing the first left orifice A2L flows through the measuring motor arrangement 15. The measuring motor arrangement is operatively connected to the spool-sleeve-set and restores spool and sleeve back to their original or neutral position once a required amount of hydraulic fluid has been supplied to one of the working ports L, R.

When, however, the pressure at the pressure port P decreases and the valve 18 is switched into the position in which the parallel connection between the measuring motors 16, 17 is interrupted and the measuring motor 17 is short-circuited, the measuring motor 16 can be rotated by the steering wheel and is in this case operated as pump.

A check valve 21 in the main flow path 6 opening from the pressure port P in direction to the bridge arrangement 14 prevents that fluid pressurized by the measuring motor 16 can escape through the pressure port P.

A variable main orifice A1 is arranged in the main flow path 6 upstream the first left orifice A2L and the first right orifice A2R. The main orifice A1 is in a first embodiment closed in the neutral position so that no hydraulic fluid can reach the bridge arrangement 14. In this way a closed neutral can be achieved.

In another embodiment the main orifice A1 can allow a small permanent flow. However, this flow is minimized in the neutral position. An outcome of having a lower supply flow entering the bridge arrangement 14 is that the general pressure level inside the bridge arrangement 14 will be lowered and therefore the outer forces acting on the steering motor 2 will have a greater impact on the steering system, in particular the gear set of the measuring motors 16, 17, thereby improving the self-realignment capabilities.

Furthermore, a tank orifice A10 can be arranged in the tank flow path 7.

When the tank orifice A10 is a fixed orifice it can be used for creating a back pressure that is independent on the opening degree of first and second orifices in their respective flow paths. When a spool-sleeve-set is used, the back pressure is independent of the spool-sleeve-angle for improved stability.

It is, however, also possible to use a variable tank orifice A10 to decrease the resistance across the variable second orifices A3L, A3R and to improve the emergency steering.

A further modification uses a variable third left orifice A4L arranged in the left working flow path 8 and a variable third right orifice A4R arranged in the right working flow path 9. This allows for the possibility to make a closed-neutral set of orifices in an open-center system. In particular when a spool-sleeve-set is used, it is possible to make a closed-neutral spool-sleeve set.

The variable third left orifice A4L and the variable third right orifice A4R open preferably faster than the variable first left orifice A2L and the variable right orifice A2R. The variable third orifices A4L, A4R are in principal used to cut off the working flow path 8, 9 and to trap hydraulic fluid in the working flow path 8, 9 and in the respective pressure chambers of the steering motor.

The main orifice A1, the tank orifice A10 and the variable third orifices A4L, A4R can be used in basically all combinations. The main orifice A1 can be used alone. The tank orifice A10 can be used alone. The variable third orifices A4L, A4R can be used alone. It is however, possible to use the main orifice 1 together with the tank orifice A10 and/or together with the variable third orifices A4L, A4R. Furthermore, it is possible to use the tank orifice A10 together with the variable third orifices A4L, A4R.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein a measuring motor arrangement is arranged in one of the left working flow path and the right working flow path, the measuring motor arrangement having a first measuring motor and a second measuring motor, and wherein a variable main orifice is arranged in the main flow path upstream the variable first left orifice and the variable first right orifice.

2. The hydraulic steering unit according to claim 1, wherein a valve is arranged between the measuring motors establishing a parallel connection between the measuring motors or interrupting the parallel connection.

3. The hydraulic steering unit according to claim 2, wherein the valve short-circuits one of the measuring motors when the parallel connection is interrupted.

4. The hydraulic steering unit according to claim 3, wherein the valve is actuated by a pressure difference between the pressure port and the tank port and the force of a spring.

5. The hydraulic steering unit according to claim 3, wherein a check valve is arranged between the pressure port and the bridge arrangement, the check valve opening in a direction towards the bridge arrangement.

6. The hydraulic steering unit according to claim 2, wherein the valve is actuated by a pressure difference between the pressure port and the tank port and the force of a spring.

7. The hydraulic steering unit according to claim 2, wherein a check valve is arranged between the pressure port and the bridge arrangement, the check valve opening in a direction towards the bridge arrangement.

8. The hydraulic steering unit according to claim 2, wherein a variable third left orifice is arranged in the left working flow path and a variable third right orifice is arranged in the right working flow path.

9. The hydraulic steering unit according to claim 1, wherein a check valve is arranged between the pressure port and the bridge arrangement, the check valve opening in a direction towards the bridge arrangement.

10. The hydraulic steering unit according to claim 1, wherein a tank orifice is arranged in the tank flow path.

11. The hydraulic steering unit according to claim 10, wherein the tank orifice is a variable orifice.

12. The hydraulic steering unit according to claim 1, wherein a variable third left orifice is arranged in the left working flow path and a variable third right orifice is arranged in the right working flow path.

13. The hydraulic steering unit according to claim 12, wherein the variable third left orifice and the variable third right orifice open faster than the variable first left orifice and the variable first right orifice.

14. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein a measuring motor arrangement is arranged in one of the left working flow path and the right working flow path, the measuring motor arrangement having a first measuring motor and a second measuring motor, and wherein a check valve is arranged between the pressure port and the bridge arrangement, the check valve opening in a direction towards the bridge arrangement.

15. The hydraulic steering unit according to claim 14, wherein a valve is arranged between the measuring motors establishing a parallel connection between the measuring motors or interrupting the parallel connection.

16. The hydraulic steering unit according to claim 14, wherein a tank orifice is arranged in the tank flow path.

17. The hydraulic steering unit according to claim 14, wherein a variable third left orifice is arranged in the left working flow path and a variable third right orifice is arranged in the right working flow path.

18. A hydraulic steering unit comprising a supply port arrangement having a pressure port connected to a main flow path and a tank port connected to a tank flow path, a working port arrangement having a left working port connected to a left working flow path and a right working port connected to a right working flow path, a bridge arrangement of variable orifices having a first left orifice connected to the main flow path and to the left working flow path, a first right orifice connected to the main flow path and to the right working flow path, a second left orifice connected to the left working flow path and to the tank flow path, and a second right orifice connected to the right working flow path and to the tank flow path, wherein a measuring motor arrangement is arranged in one of the left working flow path and the right working flow path, the measuring motor arrangement having a first measuring motor and a second measuring motor, and wherein a variable third left orifice is arranged in the left working flow path and a variable third right orifice is arranged in the right working flow path.

19. The hydraulic steering unit according to claim 15, wherein a valve is arranged between the measuring motors establishing a parallel connection between the measuring motors or interrupting the parallel connection.

20. The hydraulic steering unit according to claim 15, wherein a check valve is arranged between the pressure port and the bridge arrangement, the check valve opening in a direction towards the bridge arrangement.

* * * * *

UNITED STATES PATENT AND TRADEMARK OFFICE
CERTIFICATE OF CORRECTION

PATENT NO. : 10,717,464 B2
APPLICATION NO. : 15/970344
DATED : July 21, 2020
INVENTOR(S) : Niels Arbjerg et al.

Page 1 of 1

It is certified that error appears in the above-identified patent and that said Letters Patent is hereby corrected as shown below:

In the Claims

Column 8, Claim 19, Line 12, please replace "15" with -- 18 --.

Column 8, Claim 20, Line 16, please replace "15" with -- 18 --.

Signed and Sealed this
Twentieth Day of October, 2020

Andrei Iancu
*Director of the United States Patent and Trademark Office*